United States Patent
Moore et al.

(10) Patent No.: US 10,492,040 B2
(45) Date of Patent: Nov. 26, 2019

(54) SUBSCRIBER RECORD REFERENCING CLASS OF SERVICE RECORDS

(71) Applicant: Hewlett Packard Enterprise Development LP, Houston, TX (US)

(72) Inventors: Tiffany A. Moore, Omaha, NE (US); John I. Ayers, Omaha, NE (US); Brad Kenyon, Omaha, NE (US); Karen D. Hennigan, Omaha, NE (US); Anders H. Askerup, Omaha, NE (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/375,379

(22) Filed: Apr. 4, 2019

(65) Prior Publication Data

US 2019/0230483 A1    Jul. 25, 2019

Related U.S. Application Data (62) Division of application No. 15/310,920, filed as application No. PCT/US2014/047194 on Jul. 18, 2014, now abandoned.

(51) Int. Cl.
| | |
|---|---|
| *H04W 4/18* | (2009.01) |
| *G06F 16/22* | (2019.01) |
| *G06F 16/24* | (2019.01) |
| *H04W 8/18* | (2009.01) |
| *G06F 21/41* | (2013.01) |
| *G06F 21/62* | (2013.01) |
| *H04W 12/04* | (2009.01) |
| *H04W 12/08* | (2009.01) |
| *H04W 88/14* | (2009.01) |

(52) U.S. Cl.
CPC .............. *H04W 4/18* (2013.01); *G06F 16/22* (2019.01); *G06F 16/24* (2019.01); *G06F 21/41* (2013.01); *G06F 21/6272* (2013.01); *H04W 8/18* (2013.01); *H04W 12/04* (2013.01); *H04W 12/08* (2013.01); *H04W 88/14* (2013.01)

(58) Field of Classification Search
CPC .......... H04W 4/18; H04W 88/14; G06F 16/22
USPC .......................... 455/414.1, 418, 422.1, 403
See application file for complete search history.

(56) References Cited

U.S. PATENT DOCUMENTS

| | | | |
|---|---|---|---|
| 8,472,946 B2 | 6/2013 | Chan et al. | |
| 2004/0167680 A1 | 8/2004 | Nakajima et al. | |

(Continued)

FOREIGN PATENT DOCUMENTS

| | | | |
|---|---|---|---|
| EP | 1799005 A1 | 6/2007 | |
| EP | 1978758 A1 | 10/2008 | |

(Continued)

OTHER PUBLICATIONS

3GPP, "3rd Generation Partnership Project; Technical Specification Group Core Network and Terminals; Subscriber data management; Stage 2, Release 11," 3GPP TS 23.016 V11.0.0, Technical Specification, Sep. 2012, Sections 3.2 and 4.5.4, figures 1-2, 15.

(Continued)

*Primary Examiner* — Nghi H Ly (57) ABSTRACT

A subscriber record may include a plurality of references to a plurality of specific class of service records. Each class of service record may relate to a different type of customized applications service subscriber information.

20 Claims, 3 Drawing Sheets

(56) References Cited

U.S. PATENT DOCUMENTS

| | | | |
|---|---|---|---|
| 2008/0204283 A1* | 8/2008 | Krimerman | H03M 7/30 |
| | | | 341/60 |
| 2010/0035608 A1 | 2/2010 | Zhu et al. | |
| 2010/0048197 A1* | 2/2010 | Jiang | H04W 8/26 |
| | | | 455/422.1 |
| 2010/0154035 A1 | 6/2010 | Damola et al. | |
| 2010/0291924 A1* | 11/2010 | Antrim | H04W 60/00 |
| | | | 455/433 |
| 2011/0021179 A1 | 1/2011 | Montz | |
| 2011/0045828 A1 | 2/2011 | Madan et al. | |
| 2011/0250895 A1* | 10/2011 | Wohlert | H04W 4/16 |
| | | | 455/445 |
| 2012/0167162 A1 | 6/2012 | Raleigh et al. | |

FOREIGN PATENT DOCUMENTS

| | | |
|---|---|---|
| IN | 01181CH2008 | 11/2009 |
| WO | WO-2013104913 A1 | 7/2013 |

OTHER PUBLICATIONS

3GPP, 3rd Generation Partnership Project; Technical Specification Group Core Network and Terminals; Customised Applications for Mobile network Enhanced Logic (CAMEL) Phase 4; Stage 2; IM CN Interworking (Release 9), 3GPP TS 23.278 V9.0.0, Dec. 2009.
International Search Report & Written Opinion received in PCT Application No. PCT/US2014/047194, dated Aug. 12, 2015, 11 pages.

\* cited by examiner

SUBSCRIBER RECORD REFERENCING CLASS OF SERVICE RECORDS

CROSS-REFERENCE TO RELATED PATENT APPLICATIONS

This application is a divisional of U.S. patent application Ser. No. 15/310,920, filed on Nov. 14, 2016, which is a U.S. national stage entry under 35 U.S.C. 371 of International Application No. PCT/US2014/047194, filed on Jul. 18, 2014, the contents of which are incorporated by reference herein in their entirety.

BACKGROUND

The use of CAMEL (customized applications for mobile network enhanced logic) enables communication network operators, such as GSM or 3G network operators, to provide a wide range of enhanced services that are not provided for by the core communication network. CAMEL services are provided by appropriate service platforms, and enables network operators to provide subscribers with specific services both within, and when roaming outside, the home communication network.

If a functional entity of a mobile network, such as a visited MSC (VMSC), a gateway mobile switching center (GMSC) or a serving GPRS support node (SGSN), supports CAMEL functionality, the home location register (HLR) in the mobile network is configured with appropriate CAMEL subscriber information (CSI).

When a CAMEL subscriber attempts to register in an appropriate functional entity of a mobile network, such as in a VMSC or SGSN, the functional entity sends a registration request to the HLR. The registration request includes an identifier of the subscriber.

The HLR then retrieves a set of CAMEL subscriber information (CSI) for the particular set of CAMEL services to which the registering subscriber has access.

BRIEF DESCRIPTION OF THE DRAWINGS

Certain examples are described in the following detailed description and in reference to the drawings, in which.

DETAILED DESCRIPTION OF SPECIFIC EXAMPLES

There are many different types of customized applications services. For example, the 3G PP TS 29.002, TS 22.078, and TS 23.078 specifications describe various types CAMEL subscription information (CSI), such as Dialed Services CSI (D-CSI), General Packet Radio Service (CPRS) CSI (GPRS-CSI), Mobility Management event CSI (M-CSI), Originating CSI (O-CSI), Supplementary Service CSI (SS-CSI), Terminating CSI (T-CSI), Translation Information Flag CSI (TIF-CSI), and Short Message Service (SMS) CSI (SMS-CSI). Each CSI may have multiple possible settings.

In some HLR systems, the set of customized applications services for a subscriber are stored as a class of service (COS) record. For example, each COS record may comprise a set of CSI settings and registration actions forming a unified package. This approach supports situations where the group of CSI are interrelated and all settings work together to provide one service package to the subscriber. This group approach may assume that the total number of such service packages is not extremely high. For example, this approach may be suitable when there are less than a few hundred different service packages.

Some service providers may desire to provide higher numbers of service packages than what is available through a single COS approach. For example, an operator may desire the ability to customize the CSIs for each subscriber. As another example, an operator may want to provide different versions of multiple types of CSI. For example, if an operator offered 10 of each of T-CSI, D-CSI, O-CSI, and SMS-CSI classes of service, then 10,000 separate COS records would need to be provisioned under the single COS approach.

In some implementations of the described technology, different types of customized applications services are associated with separate COS records. For example, in a system utilizing CAMEL settings, each CSI may be associated with individual COS records. A subscriber record containing the customized application service information for a subscriber may include references to a plurality of different specific COS records relating to different types of customized application service subscriber information. For example, a subscriber record for CAMEL subscriber information may contain references to a plurality of different types of CAMEL CSI COS files. This reduces the number of separate COS records needed to customize applications on a subscriber level.

Figure 1:
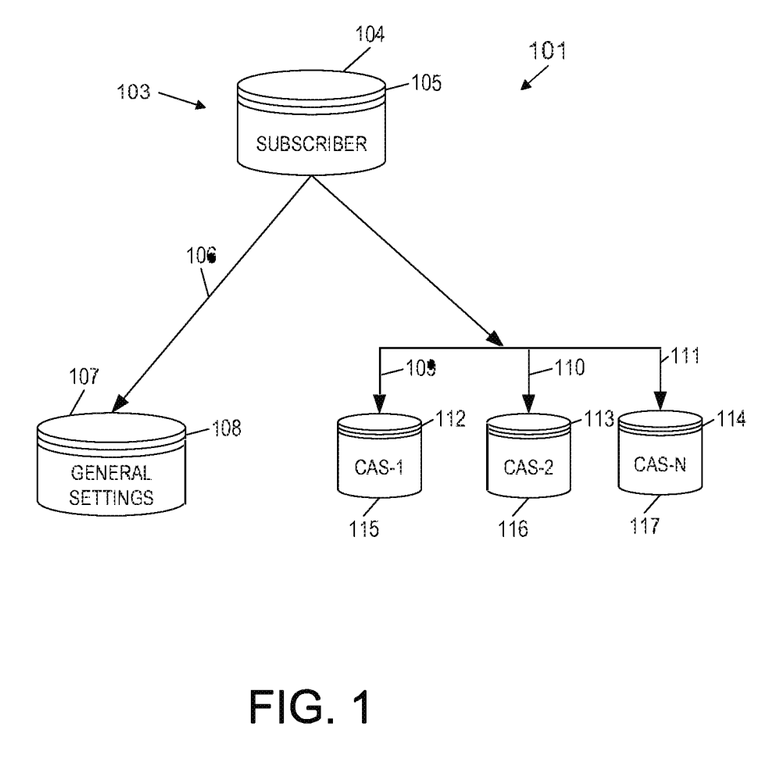
FIG. 1 illustrates an example system having a subscriber record with a plurality of references to specific class of service records relating to different types of customized applications service subscriber information.

FIG. 1 illustrates an example system 101 having a subscriber record 104 with a plurality of references 109-111 to specific COS records relating to different types of customized applications service subscriber information. For example, system 101 may be an HLR or a Home Subscriber System (HSS) with integrated HLR capabilities.

The subscriber record 104 may be stored as in a subscriber database 103 on a persistent storage system. The subscriber record 104 may comprise a set of fields 105, 106, 109-111. In some implementations, the subscriber record 104 stores a CAMEL subscriber profile for a subscriber associated with the subscriber record 104. For example, the subscriber record 104 may be associated with an International mobile Subscriber Identity (IMSI) number. The subscriber record 104 may be one of many stored in the database 103. For example, the database 103 may store thousands or millions of files records 104 associated with a mobile operator's subscribers.

The record 104 may include a reference 106 to a general COS record 108 containing general customized application service settings. For example, the general COS record 108 may include general customized applications service settings, such as registration actions. For example, if the customized application services are CAMEL services, the general COS record 108 may be a general CAMEL COS record containing general CAMEL settings, such as Registration Actions indicating alternate treatment if a serving visitor location register (VLR) or serving GPRS support node (SGSN) does not support the appropriate CAMEL phase. Additionally, the general COS record 108 may contain customized applications services settings that are not included in the specific COS records 112, 113, 114.

In some implementations, the general COS record 108 is stored in a general customized application service settings file 107. In some implementations, the general settings file 107 is stored as a database on persistent storage. The general settings file 107 may be stored in the same physical or logical volume as the subscriber database 103 or a different physical or logical volume than the subscriber database 103.

The fields may also include a plurality of references 109, 110, 111 to corresponding COS records 112, 113, 114. The references 109, 110, 111 may include COS names or identification numbers (IDs) for each COS record 112, 113, 114. For example, the references 109, 110, 111 may be stored as COS names in the subscriber record 104. The system 101 may map the COS name to an ID number when accessing the record 104 and retrieving the records 112, 113, 114. In some cases, each COS record 112, 113, 114 may relate to a different type of customized applications service subscriber information. For example, each COS record 112, 113, 114 may correspond to a different type of CSI.

In some implementations, the COS records 112, 113, 114 are stored in corresponding customized applications service files 115, 116, 117. In some cases, the files 115, 116, 117 are stored as separate databases on persistent storage. In other cases, the files 115, 116, 117 are logical files stored as sets of records in a single database. For example, each COS record 112, 113, 114 may have a record type indicator identifying the type of subscriber information it contains. In further cases, the files 107, 115, 116, 117 are all logical files stored as sets of records in a single database. For example, each general record 108 may also have a record type indicator identifying it as a general COS record.

The record 104 may also include a subscriber identification (ID) 105 that is unique to all the subscriber records 104 stored on the system 101 or associated with a mobile operator. The unique subscriber identification (ID) 105 may be generated from the references 109, 110, 111. For example, the subscriber ID 105 may be generated by concatenating the record IDs associated with the references 109, 110, 111 and hashing the result. In some cases, multiple subscriber profile files 104 may include references to the same COS records 112, 113, 114. In some cases, additional subscriber information may be used to generate the unique subscriber ID 105. For example, the subscriber's IMSI may be used in addition to the references 109, 110, 111 to generate the unique subscriber ID. In other cases, other data, such as a random seed may be used with the references 109, 110, 111 to generate the unique subscriber ID.

Figure 2:
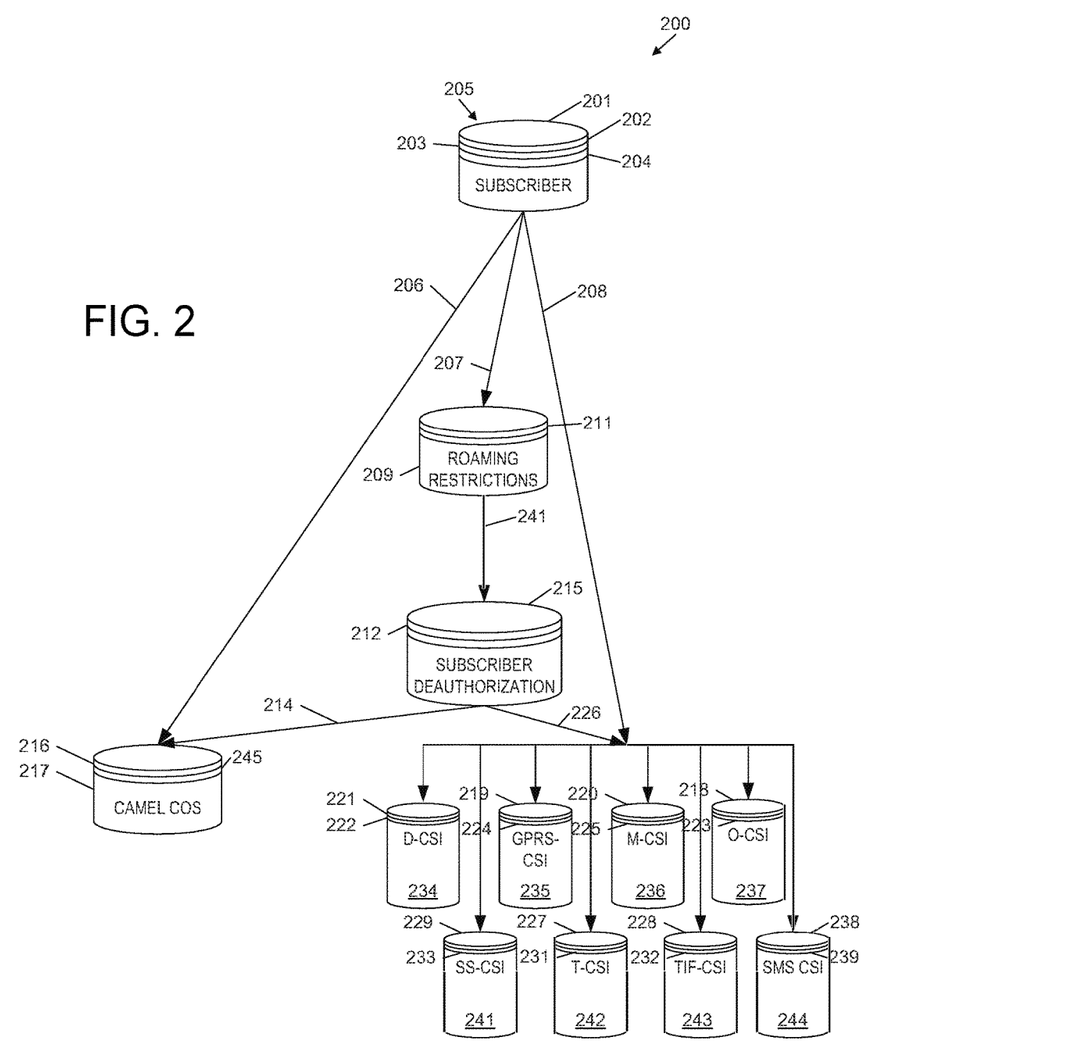
FIG. 2 illustrates an example system with HLR functionality having a subscriber record with a plurality of references to type-specific CAMEL CSI class of service records.

FIG. 2 illustrates an example system 200 with HLR functionality. The example system 200 may be an implementation of the example system 101 of FIG. 1. For example, system 200 may be a standalone HLR or an HSS with integrated HLR capabilities. In this example, the system 200 may provision and serve CAMEL data in a mobile network.

The example system 200 includes a subscriber record 201. The subscriber record 201 may be stored in a subscriber database 205 on persistent storage. For example, the subscriber record 201 may be stored along with thousands or millions of other subscriber records 201 the database 205. In the illustrated implementation, the subscriber record 201 stores CAMEL information for the subscriber using references to CAMEL records in a set of CAMEL files.

The subscriber record 201 may store a reference 206 to a general CAMEL COS record 216. For example, the reference 206 may be set as a CAMEL COS name value when the record 201 is provisioned. The CAMEL COS name may be translated by the system 200 into a COS ID when the file 204 is stored in the database. The CAMEL COS record 216 may store general CAMEL settings that apply to all active CSIs, including registration actions, which indicated alternative treatment if the serving VLR/SGSN does not support the appropriate CAMEL Phase. The CAMEL COS record 216 may also store any specific CSI that are not stored in CSI-type specific records 221, 216, 220, 218, 229, 227, 228, 238.

The general CAMEL COS record 216 may be stored in a CAMEL COS file 217. The CAMEL COS file 217 may store a plurality of records 216. Each record 216 may be referenced by any number of subscriber records 204. The CAMEL COS file 217 may be stored in a CAMEL COS database. For example, the CAMEL COS file 217 may be stored in a database in persistent storage.

The subscriber record 201 may further store a plurality 208 of references to specific CSI COS records 221, 216, 220, 218, 229, 227, 228, 238. In this example, the subscriber record stores references 208 to a D-CSI COS record 221, a CPRS-CSI COS record 219, an M-CSI COS record 220, an O-CSI COS record 218, an SS-CSI COS record 229, a T-CSI COS record 227, a TIF-CSI COS record 228, and an SMS-CSI COS record 238. Like the general CAMEL COS record reference 206, the references 208 may be stored as CSI-specific COS name values when the record 201 is provisioned. The CSI-specific COS name values may be translated into CSI-specific COS IDs when the file 204 is stored in the database.

In some implementations, the system 200 may store different CSI-specific COS records. For example, the system 200 may include separate T-CSI records 227, 231; O-CSI records 218, 223; and SMS-CSI records 238, 239. The remaining CSI-specific information may be contained in the general CAMEL COS records 216, 245. For example, GPRS-CSI, M-CSI, O-CSI, SS-CSI, and TIF-CSI settings may be contained in the general CAMEL COS records 216, 245.

The CSI-specific COS records 221, 216, 220, 218, 229, 227, 228, 238 may be stored in respective CSI-specific COS files 234, 235, 236, 237, 241, 242, 243, 244. In some cases, the CSI-specific COS files 234, 235, 236, 237, 241, 242, 243, 244 may be logical files stored on a single database in a persistent storage system. For example, the logical files may be delimitated by COS-type indicators stored in the records 221, 216, 220, 218, 229, 227, 228, 238. In some cases, the CSI-specific records 221, 216, 220, 218, 229, 227, 228, 238 and the general COS records 216 are stored together in a single database. Additionally, the files 234, 235, 236, 237, 241, 242, 243, 244 may be stored in the same database as CAMEL COS file 217.

The subscriber record 201 may further include various information, such as fields 202 storing a separate service control function address (SCF address) for each COS record 216, 221, 219, 220, 218, 229, 227, 228, 238. The fields may also include fields 203 storing a separate service key for each COS record 216, 221, 219, 220, 218, 229, 227, 228, 238. These SCFs and service keys may override any SCFs and service keys contained in the records 216, 221, 219, 220, 218, 229, 227, 228, 238 themselves. Additionally, for CSIs supporting more than one trigger detection points (TOPS), the records 202 may include separate service key and SCFs for each trigger detection point.

The subscriber record 201 may further include a unique subscriber ID 204. The unique subscriber ID 204 may be generated from the references 206, 208 as described with respect to ID 105 of FIG. 1. For example, the ID 204 may be generated by hashing the CSI-specific and general CAMEL COS record IDs.

The subscriber record 201 may further include a reference 207 to a roaming restrictions COS record 211. The roaming restrictions COS record 211 may contain settings for special handling depending on the serving VLR or SGSN of the subscriber. The roaming restrictions COS record 211 may be stored in a roaming restrictions COS file 209. Each record 211 in the roaming restrictions COS file 209 may apply to a range of E.164 addresses or to a single E.164 address and may be referenced by any number of subscriber records 201. In some cases, the roaming restrictions COS file 209 does not contain CAMEL data. However, the record 211 may include a reference 241 to a subscriber deauthorization configuration (SOC) COS record 212.

The SOC COS record 212 may include references 214, 226 to CAMEL COS records 242, 222, 224, 225, 223, 233, 231, 232, 239. These references 214, 226 may point to different COS records than referenced by the subscriber record references 206, 208. The reference 214 may point to a general CAMEL COS record 245 and CSI-specific records 222, 224, 225, 223, 233, 231, 232, 239 that override the general CAMEL COS record 216 and CSI-specific records 221, 219, 220, 218, 229, 227, 228, 238 when the roaming restrictions record 211 is active.

Figure 3:
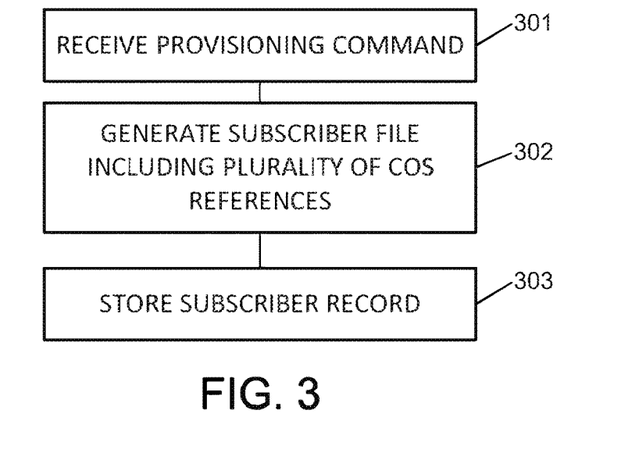
FIG. 3 illustrates an example method of provisioning subscriber records having references to a plurality of class of service records.

FIG. 3 illustrates an example method of provisioning subscriber records having references to a plurality of COS records. For example, the illustrated method may be performed by a server having HLR functionality, such as the system 101 of FIG. 1 or the system 200 of FIG. 2.

The example method includes block 301. Block 301 may include receiving a provisioning command to provision customized applications services for a subscriber. In some cases, the provisioning command may be a command to add new information to update a record for a new subscriber. In other cases, the provisioning command may be a command to update information in an existing record for an existing subscriber. For example, the provisioning command may be received as inputs in an interface or online form provided by the HLR to a mobile operator. As another example, the provisioning command may be received as a data file sent to the HLR by a provisioning system. The provisioning command may include a variety of subscriber information. For example, the provisioning command may include settings indicating to which customized service application COSs the subscriber has access. For example, the provisioning command may include a name for a general CSI COS and a set of names for different types of CSI COSs. Additionally, the provisioning command may include overriding service control function addresses and overriding service keys for the different COSs.

In some implementations, the provisioning command may include information identifying a COS of roaming restriction information. The roaming restriction information may also include customized service application COSs that apply when the roaming restrictions are in effect.

The example method also includes block 302. Block 302 may include generating a subscriber record comprising references to a plurality of COS records. For example, generating the subscriber record may include adding a new subscriber record to a subscriber database. As another example, generating the subscriber record may include updating existing subscriber information in an existing subscriber record of the subscriber database. The generated subscriber record may correspond to the information contained in the provisioning command received in block 301. Each COS record may relate to a different type of customized applications service subscriber information. In some implementations, block 302 may include generating the subscriber record to comprise a reference to a general COS record containing general customized application service settings. Additionally, block 302 may include generating the subscriber record to comprise an overriding service control function address and overriding service key for each COS record. For example, the subscriber record may be generated to have the structure described with the respect to subscriber record 104 of FIG. 1 or subscriber record 201 of FIG. 2.

In some implementations, the customized applications services are Customized Applications for Mobile networks Enhanced Logic (CAMEL) services. In these implementations, the COS records may comprise a plurality of: a D-CSI COS record, a GPRS-CSI COS record, an M-CSI COS record, an O-CSI COS record, an SS-CSI COS record, a T-CSI COS record, a TIF-CSI COS record, and an SMS-CSI COS record. If the COS records comprise less than the entire plurality of different CSI-specific records, the remaining CSI-specific information may be stored in the general COS record. For example, in one implementation, the COS records comprise a T-CSI record, an O-CSI record, and an SMS-CSI record. In this implementation, GPRS-CSI, M-CSI, O-CSI, SS-CSI, TIF-CSI, and any other specific type of CSI settings may be contained in the general CAMEL COS record.

In some implementations, block 302 may include generating the subscriber record to comprise a unique ID for the subscriber using the references to the plurality of COS records. For example, the unique ID may be generated as described with respect to the unique ID 105 of FIG. 1 or ID 204 of FIG. 2.

In some implementations, block 302 may include generating the subscriber record to comprise a reference to a roaming restrictions COS record. The roaming restrictions COS record may comprise a reference to a subscriber deauthorization configuration COS record. The subscriber deauthorization configuration COS record may comprise a set of references relating to specific CAMEL CSI COS records. For example, the roaming restrictions COS record and subscriber deauthorization configuration COS record may be as described with respect to FIG. 2.

The example method may further include block 303. Block 303 may include storing the subscriber record in a non-transitory computer readable medium. For example, block 303 may include storing the subscriber record in a subscriber database on a persistent storage system as described with respect to FIGS. 1 and 2.

Figure 4:
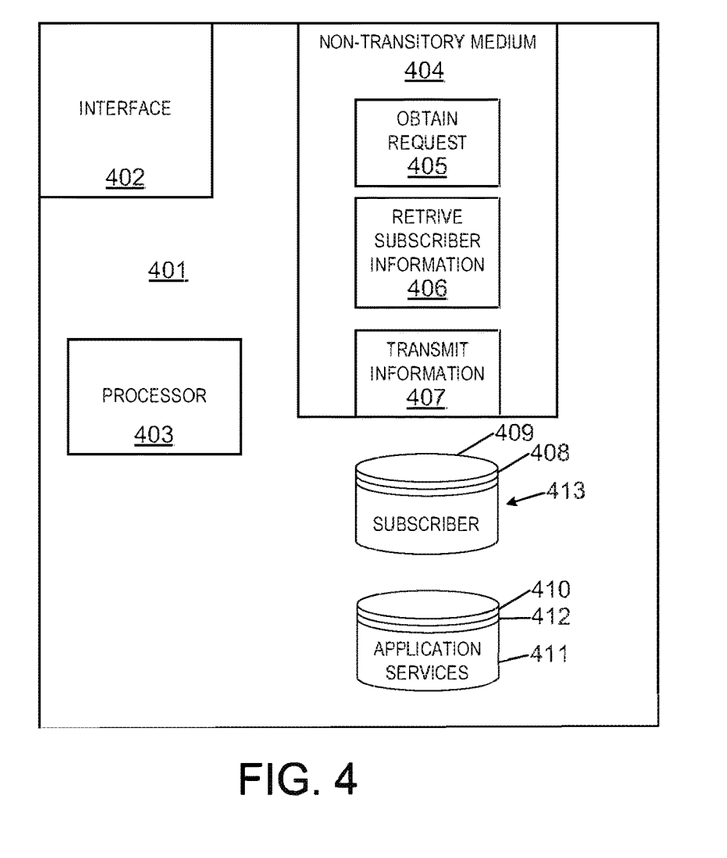
FIG. 4 illustrates an example system including a non-transitory computer readable medium storing instructions to retrieve subscriber information from a subscriber record comprising references to a plurality of class of service records.

FIG. 4 illustrates an example system 401 including a non-transitory computer readable medium 404 storing instructions 406 to retrieve subscriber information from a subscriber record 409 comprising references 408 to a plurality of COS records 410. For example, the example system 401 may be a server having HLR functionality, such as a standalone HLR or an HSS having HLR capabilities.

The example system 401 includes an interface 402. The interface 402 allows the system 401 to receive subscriber information requests and serve customized applications services information, such as CAMEL information, to various network components. For example, the interface 402 may allow the system to serve such information to requesting VLRs or SGSNs.

The example system further includes instructions 405-406 stored on a non-transitory computer readable medium 405. For example, the medium 405 may be random-access memory, flash memory, storage, or a combination thereof. These instructions 405-406 may be executed by a processor 403 to cause the system 401 to serve customized services information to requesting network devices.

The medium 405 may store instructions 405. Instructions 405 may be executable to obtain a request for subscriber information. The instructions 405 may be executable by the processor 403 to obtain a request for subscriber information via the interface 402. For example, the request for subscriber information may be an Update GPRS Location request received from an SGSN.

The medium 405 may also store instructions 406. Instructions 406 may be executable by the processor 403 to receive the subscriber information from a subscriber record 409. The subscriber information may include information related to customized applications services. For example, the subscriber record 409 may be stored in a subscriber database 413 on the system 401 and loaded into memory when retrieved.

In some implementations, the subscriber record 409 may have the structure described with respect to the subscriber record 104 of FIG. 1 or the subscriber record 201 of FIG. 2. The subscriber record 409 may include references 408 to a plurality of type-specific COS records 410. In some cases, each COS record may relate to a different type of customized applications service subscriber information. The references 408 may also include a reference to a general COS record 412 included in the records 410. The general COS record may include general customized application service settings and any type-specific information not contained in a separate type-specific record.

In some implementations, the COS records 410 comprise a plurality of D-CSI COS record, a GPRS-CSI COS record, an M-CSI COS record, an O-CSI COS record, an SS-CSI COS record, a T-CSI COS record, a TIF-CSI COS record, and an SMS-CSI COS record. For example, the COS records 410 may include a T-CSI record, an O-CSI record, and an SMS-CSI record. In this example, GPRS-CSI, M-CSI, O-CSI, SS-CSI, TIF-CSI, and any other specific type of CSI settings may be contained in the general CAMEL COS record 412.

In the illustrated example, the COS records 410, 412 are stored in a single customized application services database 411. In this example, each record 410, 412 may include a record type identifier identifying what type of application service information is stored in the record.

In some implementations, the subscriber record 409 may further include an overriding service control function address and service key for each COS record. In these implementations, the instructions 406 may be executable by the processor 403 to retrieve the overriding service control function address and the overriding service key for each class of service record.

In some implementations, the subscriber record 409 may further include a unique subscriber ID. This ID may be generated by the system 401 as described with respect to ID 105 of FIG. 1 or ID 204 of FIG. 2. In these implementations, the instructions 406 may be executable by the processor 403 to retrieve a unique subscriber identification (ID) generated using the references 408.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
receiving, by a home location register (HLR) device, a registration request from a mobile switching center (MSC) device or a serving general packet radio services (GPRS) support node (SGSN) device, for a subscriber that a mobile device of which has entered a network of the MSC device or the SGSN device;
responsively retrieving, by the HLR device, a subscriber record for the subscriber from a database, the subscriber record storing customized applications for mobile network enhanced logic (CAMEL) information using references to CAMEL records in a set of CAMEL files;
retrieving, by the HLR device, a general CAMEL class of service (COS) record for the subscriber to which a first reference of the references points, from a first CAMEL COS file of the set of CAMEL files, the general CAMEL COS record storing general CAMEL settings applying to a plurality of CAMEL subscriber information (CSI) services;
retrieving, by the HLR devices, a corresponding plurality of specific CAMEL COS records for the subscriber to which a plurality of second references of the references point, from a corresponding plurality of second CAMEL COS files of the set of CAMEL files, each specific CAMEL COS record storing specific CAMEL settings applying to a different CAMEL CSI service of the CSI services; and
provisioning the CSI services for the subscriber according to the general CAMEL COS record retrieved from the first CAMEL COS file and according to the specific CAMEL COS records retrieved from the second CAMEL COS files.

2. The method of claim 1, further comprising:
receiving, by the HLR device, a second registration request from a second MSC device or a second GPRS SGSN device, for the subscriber that the mobile device of which has roamed to and has entered a second network of the MSC device or the SGSN device;
retrieving, by the HLR device, a roaming restrictions COS record for the subscriber to which a third reference of the references points, from a roaming restrictions COS file of the set of CAMEL files, the roaming restrictions COS record storing a reference to a subscriber deauthorization configuration (SDC) COS record from a third CAMEL COS file of the set of CAMEL files;
retrieving, by the HLR device, the SDC COS record to which the reference to the SDC COS record points, from the third CAMEL COS file, the SDC COS record storing overriding references to the CAMEL records in the set of CAMEL files;
retrieving, by the HLR device, an overriding general CAMEL COS record for the subscriber to which a first overriding reference of the overriding references points, from the first CAMEL COS file, the overriding CAMEL COS record storing general CAMEL settings applying to the CAMEL CSI services; and
retrieving, by the HLR device, a corresponding plurality of overriding specific CAMEL COS records for the subscriber to which a second overriding reference of the overriding references points, from the corresponding plurality of second CAMEL COS files, each overriding specific CAMEL COS record storing specific CAMEL settings applying to a different CAMEL CSI service of the CSI services.

3. The method of claim 2, further comprising:
again provisioning the CSI services for the subscriber according to the overriding general CAMEL COS record retrieved from the first CAMEL COS file and according to the overriding specific CAMEL COS records retrieved from the second CAMEL COS files,
wherein the general CAMEL settings of the overriding general CAMEL COS record override the general CAMEL settings of the general CAMEL COS record,
and wherein the specific CAMEL settings of the overriding specific CAMEL COS records override the specific CAMEL settings of the specific CAMEL COS records.

4. The method of claim 3, wherein again provisioning the CSI services for the subscriber comprises provisioning each CSI service according to the general CAMEL settings of the overriding general CMALE COS record and according to the specific CAMEL settings of the overriding specific CAMEL COS record corresponding to the CSI service.

5. The method of claim 2, wherein the roaming restrictions COS file does not include any CAMEL information.

6. The method of claim 5, wherein the third CAMEL COS file is a different, separate file than the first CAMEL COS file and each second CAMEL COS file,
wherein the first CAMEL COS file is a different, separate file than the second CAMEL COS file,
and wherein the second CAMEL COS files are different and separate CAMEL COS files.

7. The method of claim 1, wherein the first CAMEL COS file is a different, separate file than the second CAMEL COS file,
and wherein the second CAMEL COS files are different and separate CAMEL COS files.

8. The method of claim 7, wherein provisioning the CSI services for the subscriber comprises provisioning each CSI service according to the general CAMEL settings of the general CAMEL COS record and according to the specific CAMEL settings of the specific CAMEL COS record corresponding to the CSI service.

9. The method of claim 8, wherein the CSI services comprise: a dialed services CSI (D-CSI) service, a GPRS CSI (GPRS-CSI) service, a mobility management event CSI (M-CSI) service, an originating CSI (O-CSI) service, a supplementary service CSI (SS-CSI) service, a terminating CSI (T-CSI) service, a translation information flag CSI (TIF-CSI) service, and a short message service (SMS) CSI service.

10. A non-transitory computer-readable medium storing instructions executable by a home location register (HLR) device to:
receive a registration request from a mobile switching center (MSC) device or a serving general packet radio services (GPRS) support node (SGSN) device, for a subscriber that a mobile device of which has entered a network of the MSC device or the SGSN device;
responsively retrieve a subscriber record for the subscriber from a database, the subscriber record storing customized applications for mobile network enhanced logic (CAMEL) information using references to CAMEL records in a set of CAMEL files;
retrieve a general CAMEL class of service (COS) record for the subscriber to which a first reference of the references points, from a first CAMEL COS file of the set of CAMEL files, the general CAMEL COS record storing general CAMEL settings applying to a plurality of CAMEL subscriber information (CSI) services;
retrieve a corresponding plurality of specific CAMEL COS records for the subscriber to which a plurality of second references of the references point, from a corresponding plurality of second CAMEL COS files of the set of CAMEL files, each specific CAMEL COS record storing specific CAMEL settings applying to a different CAMEL CSI service of the CSI services; and
provision the CSI services for the subscriber according to the general CAMEL COS record retrieved from the first CAMEL COS file and according to the specific CAMEL COS records retrieved from the second CAMEL COS files.

11. The non-transitory computer-readable medium of claim 10, wherein the instructions are executable by the HLR device to further:
receive a second registration request from a second MSC device or a second GPRS SGSN device, for the subscriber that the mobile device of which has roamed to and has entered a second network of the MSC device or the SGSN device;
retrieve a roaming restrictions COS record for the subscriber to which a third reference of the references points, from a roaming restrictions COS file of the set of CAMEL files, the roaming restrictions COS record storing a reference to a subscriber deauthorization configuration (SDC) COS record from a third CAMEL COS file of the set of CAMEL files;
retrieve the SDC COS record to which the reference to the SDC COS record points, from the third CAMEL COS file, the SDC COS record storing overriding references to the CAMEL records in the set of CAMEL files;
retrieve an overriding general CAMEL COS record for the subscriber to which a first overriding reference of the overriding references points, from the first CAMEL COS file, the overriding CAMEL COS record storing general CAMEL settings applying to the CAMEL CSI services; and
retrieve a corresponding plurality of overriding specific CAMEL COS records for the subscriber to which a second overriding reference of the overriding references points, from the corresponding plurality of second CAMEL COS files, each overriding specific CAMEL COS record storing specific CAMEL settings applying to a different CAMEL CSI service of the CSI services.

12. The non-transitory computer-readable medium of claim 11, wherein the instructions are executable by the HLR device to further:
again provision the CSI services for the subscriber according to the overriding general CAMEL COS record retrieved from the first CAMEL COS file and according to the overriding specific CAMEL COS records retrieved from the second CAMEL COS files,
wherein the general CAMEL settings of the overriding general CAMEL COS record override the general CAMEL settings of the general CAMEL COS record,
and wherein the specific CAMEL settings of the overriding specific CAMEL COS records override the specific CAMEL settings of the specific CAMEL COS records.

13. The non-transitory computer-readable medium of claim 12, wherein again provisioning the CSI services for the subscriber comprises provisioning each CSI service according to the general CAMEL settings of the overriding general CMALE COS record and according to the specific CAMEL settings of the overriding specific CAMEL COS record corresponding to the CSI service.

14. The non-transitory computer-readable medium of claim 11, wherein the roaming restrictions COS file does not include any CAMEL information.

15. The non-transitory computer-readable medium of claim 14, wherein the third CAMEL COS file is a different, separate file than the first CAMEL COS file and each second CAMEL COS file,
wherein the first CAMEL COS file is a different, separate file than the second CAMEL COS file,
and wherein the second CAMEL COS files are different and separate CAMEL COS files.

16. The non-transitory computer-readable medium of claim 10, wherein the first CAMEL COS file is a different, separate file than the second CAMEL COS file,
and wherein the second CAMEL COS files are different and separate CAMEL COS files.

17. The non-transitory computer-readable medium of claim 16, wherein the HLR device is to provision the CSI services for the subscriber by provisioning each CSI service according to the general CAMEL settings of the general CAMEL COS record and according to the specific CAMEL settings of the specific CAMEL COS record corresponding to the CSI service.

18. The non-transitory computer-readable medium of claim 17, wherein the CSI services comprise: a dialed services CSI (D-CSI) service, a GPRS CSI (GPRS-CSI) service, a mobility management event CSI (M-CSI) service, an originating CSI (O-CSI) service, a supplementary service CSI (SS-CSI) service, a terminating CSI (T-CSI) service, a translation information flag CSI (TIF-CSI) service, and a short message service (SMS) CSI service.

19. A system comprising:
a storage device storing:
a database including a subscriber record for a subscriber, the subscriber record storing customized applications for mobile network enhanced logic (CAMEL) information;
a set of CAMEL class of service (COS) files storing CAMEL records to which the subscriber record includes references, including:
a first CAMEL COS file including a general CAMEL COS record for the subscriber, the general CAMEL COS record storing general CAMEL settings applying to a plurality of CAMEL subscriber information (CSI) services;
a plurality of second CAMEL COS files including a corresponding plurality of specific CAMEL COS records, each specific CAMEL COS record storing specific CAMEL settings applying to a different CAMEL CSI service of the CSI services; and
a home location register (HLR) device to:
receive a registration request from a mobile switching center (MSC) device or a serving general packet radio services (GPRS) support node (SGSN) device, for the subscriber that a mobile device of which has entered a network of the MSC device or the SGSN device;
responsively retrieve the subscriber record for the subscriber from the database;
retrieve the general CAMEL class of service (COS) record for the subscriber to which a first reference of the references of the subscriber record points, from the first CAMEL COS file of the set of CAMEL files;
retrieve the specific CAMEL COS records for the subscriber to which a plurality of second references of the references of the subscriber record point, from the second CAMEL COS files; and
provision the CSI services for the subscriber according to the general CAMEL COS record retrieved from the first CAMEL COS file and according to the specific CAMEL COS records retrieved from the second CAMEL COS files.

20. The system of claim 19, wherein the set of CAMEL COS files further includes:
a roaming restrictions COS file storing a roaming restrictions reference; and
a subscriber deauthorization file storing a subscriber deauthorization configuration (SDC) COS record for the subscriber including overriding references, the roaming restrictions reference referencing the SDC COS record,
wherein the HLR device is further to:
receive a second registration request from a second MSC device or a second GPRS SGSN device, for the subscriber that the mobile device of which has roamed to and has entered a second network of the MSC device or the SGSN device;
retrieve the roaming restrictions COS record to which a third reference of the references points, from the roaming restrictions COS file;
retrieve the SDC COS record to which the roaming restrictions reference to the SDC COS record points, from the subscriber deauthorization;
retrieve an overriding general CAMEL COS record for the subscriber to which a first overriding reference of the overriding references points, from the first CAMEL COS file, the overriding CAMEL COS record storing general CAMEL settings applying to the CAMEL CSI services;
retrieve a corresponding plurality of overriding specific CAMEL COS records for the subscriber to which a second overriding reference of the overriding references points, from the plurality of second CAMEL COS files, each overriding specific CAMEL COS record storing specific CAMEL settings applying to a different CAMEL CSI service of the CSI services; and
again provision the CSI services for the subscriber according to the overriding general CAMEL COS record retrieved from the first CAMEL COS file and according to the overriding specific CAMEL COS records retrieved from the second CAMEL COS files,
wherein the general CAMEL settings of the overriding general CAMEL COS record override the general CAMEL settings of the general CAMEL COS record,
and wherein the specific CAMEL settings of the overriding specific CAMEL COS records override the specific CAMEL settings of the specific CAMEL COS records.

* * * * *